(12) United States Patent
Backstrom

(10) Patent No.: US 9,564,651 B2
(45) Date of Patent: Feb. 7, 2017

(54) LIQUID ELECTROLYTE FUEL CELL SYSTEM

(71) Applicant: AFC Energy plc, London (GB)

(72) Inventor: Andreas Karl Backstrom, Godalming (GB)

(73) Assignee: AFC Energy plc (GB)

( * ) Notice: Subject to any disclaimer, the term of this patent is extended or adjusted under 35 U.S.C. 154(b) by 281 days.

(21) Appl. No.: 14/370,731

(22) PCT Filed: Dec. 10, 2012

(86) PCT No.: PCT/GB2012/053070
§ 371 (c)(1),
(2) Date: Jul. 3, 2014

(87) PCT Pub. No.: WO2013/104879
PCT Pub. Date: Jul. 18, 2013

(65) Prior Publication Data
US 2015/0004505 A1 Jan. 1, 2015

(30) Foreign Application Priority Data
Jan. 9, 2012 (GB) .................................. 1200260.6

(51) Int. Cl.
*H01M 8/08* (2016.01)
*H01M 8/04* (2016.01)

(52) U.S. Cl.
CPC ......... *H01M 8/083* (2013.01); *H01M 8/04164* (2013.01); *H01M 8/04276* (2013.01);
(Continued)

(58) Field of Classification Search
CPC .......................... H01M 8/083; H01M 8/04276
(Continued)

(56) References Cited

U.S. PATENT DOCUMENTS

| 3,244,564 A | 4/1966 | Fox |
| 3,287,167 A | 11/1966 | Weiss et al. |
| (Continued) | | |

FOREIGN PATENT DOCUMENTS

| GB | 1209552 A | 3/1967 |
| GB | 1471322 A | 4/1977 |
| JP | 61225774 A | 10/1986 |

OTHER PUBLICATIONS

Great Britain Search Report for Application No. GB 1200260.6 dated Mar. 20, 2013.
(Continued)

*Primary Examiner* — Basia Ridley
*Assistant Examiner* — James Erwin
(74) *Attorney, Agent, or Firm* — Tumey L.L.P.

(57) ABSTRACT

A liquid electrolyte fuel cell system (10) comprises at least one fuel cell with a liquid electrolyte chamber between opposed electrodes, the electrodes being an anode and a cathode, and means (30, 32) for supplying a gas stream to a gas chamber adjacent to the cathode and withdrawing a spent gas stream (38) from the gas chamber adjacent to the cathode, the system also comprising a liquid electrolyte storage tank (40), and means (42, 44, 47, 48) to circulate liquid electrolyte between the liquid electrolyte storage tank (40) and the fuel cells. In addition the system comprises a water storage tank (60) adjacent to the storage tank (40), and means (50, 51) for condensing water vapor from the spent gas stream (38), and for feeding (56) the condensed water vapor into the water storage tank (60). The water storage tank (60) has an overflow outlet (64); and a communication duct (68) linking the liquid electrolyte storage tank (40) and the water storage tank (60) below the level of the overflow outlet (60). This automatically replaces any water that
(Continued)

evaporates from the electrolyte, without requiring any electronics.

6 Claims, 1 Drawing Sheet

(52) U.S. Cl.
CPC .. *H01M 8/0485* (2013.01); *H01M 2300/0014* (2013.01); *Y02E 60/50* (2013.01)

(58) Field of Classification Search
USPC .......................................................... 429/414
See application file for complete search history.

(56) References Cited

U.S. PATENT DOCUMENTS

| | | | |
|---|---|---|---|
| 6,869,710 B2 | 3/2005 | Tzeng et al. | |
| 2005/0142403 A1 | 6/2005 | Ulmer et al. | |
| 2009/0325012 A1* | 12/2009 | Nor ................... | H01M 8/04089 429/454 |
| 2010/0291457 A1 | 11/2010 | Wang | |

OTHER PUBLICATIONS

International Search Report and Written Opinion for International Application No. PCT/GB2012/053070 dated Feb. 19, 2013.
Taiwan Notification for the Opinion of Examination for Taiwan Patent Application No. 102100400 dated Jul. 6, 2016.

* cited by examiner

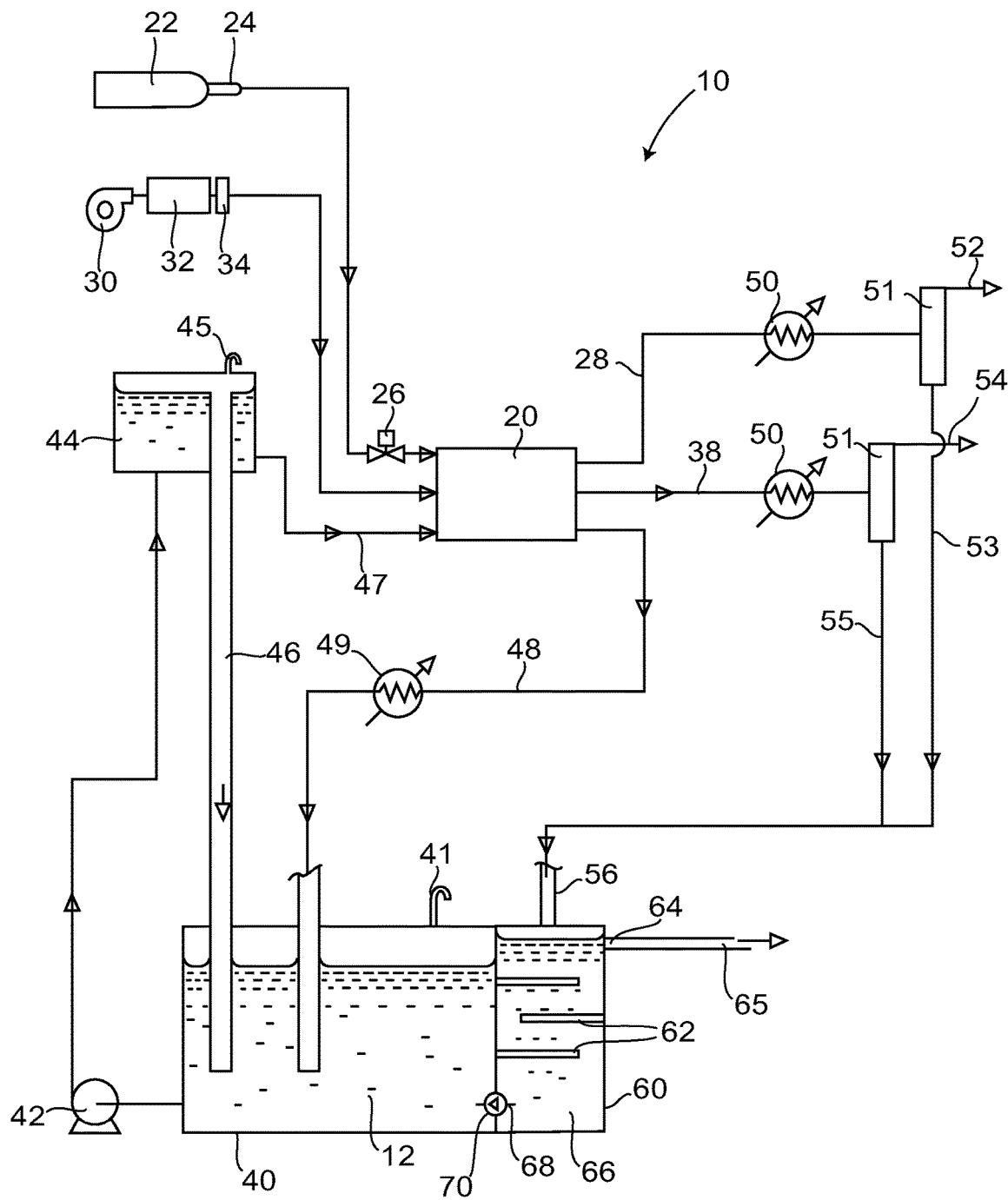

LIQUID ELECTROLYTE FUEL CELL SYSTEM

The present invention relates to liquid electrolyte fuel cell systems, preferably but not exclusively incorporating alkaline fuel cells.

BACKGROUND TO THE INVENTION

Fuel cells have been identified as a relatively clean and efficient source of electrical power. Alkaline fuel cells are of particular interest because they operate at relatively low temperatures, are efficient and mechanically and electrochemically durable. Acid fuel cells and fuel cells employing other liquid electrolytes are also of interest. Such fuel cells typically comprise an electrolyte chamber separated from a fuel gas chamber (containing a fuel gas, typically hydrogen) and a further gas chamber (containing an oxidant gas, usually air). The electrolyte chamber is separated from the gas chambers using electrodes. Typical electrodes for alkaline fuel cells comprise a conductive metal, typically nickel, that provides mechanical strength to the electrode, and the electrode also incorporates a catalyst coating which may comprise activated carbon and a catalyst metal, typically platinum.

In operation, chemical reactions occur at each electrode, generating electricity. For example, if a fuel cell is provided with hydrogen gas and with air, supplied respectively to an anode chamber and to a cathode chamber, the reactions are as follows, at the anode:

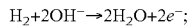

$$H_2 + 2OH^- \rightarrow 2H_2O + 2e^-;$$

and at the cathode:

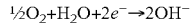

$$\tfrac{1}{2}O_2 + H_2O + 2e^- \rightarrow 2OH^-$$

so that the overall reaction is hydrogen plus oxygen giving water, but with simultaneous generation of electricity, and with diffusion of hydroxyl ions from the cathode to the anode through the electrolyte. Problems can arise due to changes in the concentration of the electrolyte, as although water is created by the reaction occurring at the anode, water also evaporates at both electrodes.

DISCUSSION OF THE INVENTION

The fuel cell system of the present invention addresses or mitigates one or more problems of the prior art.

Accordingly the present invention provides a liquid electrolyte fuel cell system comprising at least one fuel cell, each fuel cell comprising a liquid electrolyte chamber between opposed electrodes, the electrodes being an anode and a cathode, and means for supplying a gas stream to a gas chamber adjacent to an electrode and withdrawing a spent gas stream from the gas chamber adjacent to the electrode, the system also comprising a liquid electrolyte storage tank, and means to circulate liquid electrolyte between the liquid electrolyte storage tank and each liquid electrolyte chamber; wherein the system comprises a water storage tank adjacent to the liquid electrolyte storage tank, and means for condensing water vapour from the spent gas stream, and for feeding the condensed water vapour into the water storage tank; the water storage tank having an overflow outlet; and with a duct providing communication between the liquid electrolyte storage tank and the water storage tank below the level of the overflow outlet.

The overflow outlet ensures that the water level in the water storage tank is substantially constant. The height of the overflow outlet may be adjustable, but in any event is preferably set such that when the electrolyte in the electrolyte storage tank is at a desired level, the pressure at the level of the communication duct is the same in both the electrolyte storage tank and the water storage tank.

It has been found that in operation of a fuel cell system, there is a net evaporation of water, because the electrolyte is above ambient temperature. Consequently the volume of the electrolyte in the system would gradually decrease, and the electrolyte concentration would gradually increase. The system of the invention ensures that water is provided to the water storage tank, and that any reduction in volume of electrolyte in the system automatically leads to inflow of water from the water storage tank, so that the volume of electrolyte remains constant. No active control is required, as the transfer of water into the electrolyte, when required, relies solely on gravity.

The communication duct may include a non-return valve, or a manual valve, to prevent flow of electrolyte into the water storage tank during start-up. Once the fuel cell system is in operation, any such manual valve can be left open. The dimensions of the communication duct are preferably such that during operation the flow rate of water through the communication duct prevents back-diffusion of electrolyte.

In one embodiment the water storage tank includes a plurality of baffles to suppress any turbulence from the in-flowing water.

The electrode is preferably a cathode, as the spent gas flow from the gas chamber adjacent to the cathode is typically greater than that from the chamber adjacent to the anode, and usually contains a significant quantity of water vapour. The system may also include means for supplying a fuel gas stream to a gas chamber adjacent to the anode and withdrawing an exhaust gas stream from the gas chamber adjacent to the anode, and means for condensing water vapour from the exhaust gas stream, and for feeding the condensed water vapour into the water storage tank.

The invention will now be further and more particularly described, by way of example only, and with reference to the accompanying drawings in which:

FIG. 1 shows a schematic diagram of the fluid flows of a fuel cell system of the invention.

Referring to FIG. 1, a fuel cell system 10 includes a fuel cell stack 20 (represented schematically), which uses aqueous potassium hydroxide as electrolyte 12, for example at a concentration of 6 molar. The fuel cell stack 20 is supplied with hydrogen gas as fuel, air as oxidant, and electrolyte 12, and operates at an electrolyte temperature of about 65° or 70° C. Hydrogen gas is supplied to the fuel cell stack 20 from a hydrogen storage cylinder 22 through a regulator 24 and a control valve 26, and an exhaust gas stream emerges through a first gas outlet duct 28. Air is supplied by a blower 30, and is cleaned by passing through a scrubber 32 and a filter 34 before it reaches the fuel cell stack 20, and spent air emerges through a second gas outlet duct 38.

The fuel cell stack 20 is represented schematically, as its detailed structure is not the subject of the present invention, but in this example it consists of a stack of fuel cells, each fuel cell comprising a liquid electrolyte chamber between opposed electrodes, the electrodes being an anode and a cathode. In each cell air flows through a gas chamber adjacent to the cathode, to emerge as the spent air. Similarly, in each cell, hydrogen flows through a gas chamber adjacent to the anode, and the exhaust gas stream emerges, which may be referred to as a purge stream.

Operation of the fuel cell stack 20 generates electricity, and also generates water by virtue of the chemical reactions described above. In addition water evaporates, and both the exhaust gas stream and the spent air contain water vapour. The overall result would be a steady loss of water from the electrolyte 12.

The electrolyte 12 is stored in an electrolyte storage tank 40 provided with a vent 41. A pump 42 circulates electrolyte from the storage tank 40 into a header tank 44 provided with a vent 45, the header tank 44 having an overflow pipe 46 so that electrolyte returns to the storage tank 40. This ensures that the level of electrolyte in the header tank 44 is constant. The electrolyte is supplied at constant pressure through a duct 47 to the fuel cell stack 20; and spent electrolyte returns to the storage tank 40 through a return duct 48 including a heat exchanger 49 to remove excess heat.

The first gas outlet duct 28 includes a heat exchanger 50 and a gas/liquid separator 51 which condenses water vapour from the emerging exhaust gas stream, so that the cooled exhaust gas stream emerges through an outlet 52, while a stream of water emerges from an outlet 53. Similarly, the second gas outlet duct 38 includes a heat exchanger 50 and a gas/liquid separator 51 to condense water vapour from the spent air, so that the cooled spent air emerges through an outlet 54 and a stream of water emerges from an outlet 55.

The streams of water from the outlet 53 and the outlet 55 are fed through a common feed pipe 56 into a water storage tank 60 immediately adjacent to the electrolyte storage tank 40. The water storage tank 60 includes a number of horizontal baffles 62 extending from opposite walls, which suppress turbulence due to the in-flowing water, and is provided with an overflow 64 communicating with a waste water pipe 65. In use the water storage tank 60 contains water 66 up to a level set by the height of the overflow 64. The water storage tank 60 shares a common wall with the electrolyte storage tank 40, so the water 66 is warmed by the electrolyte 12, as heat passes through that common wall.

Near the bottom of the water storage tank 60 is a short linking duct 68 which provides fluid communication between the water storage tank 60 and the electrolyte storage tank 40, and the linking duct 68 includes a non-return valve 70. The height of the overflow 64 is selected such that if the level of electrolyte 12 in the electrolyte storage tank 40 is at its desired level, then at the position of the linking duct 68 the hydrostatic pressure due to the electrolyte 12 is the same as the hydrostatic pressure due to the water 66. It will be appreciated that the liquid levels are not the same, because the densities of the electrolyte 12 and the water 66 are different. Hence, in operation, excess water flows out of the overflow 64 into the waste water pipe 65, but water also flows through the linking duct 68 into the electrolyte storage tank 40 to make up for the loss of water from the electrolyte due to evaporation. The diameter of the linking duct 68 may for example be 3 or 4 mm, but in any event the diameter should be such that that water flows continuously through the linking duct 68 at a sufficient flow velocity to prevent any back-diffusion of potassium hydroxide.

When the fuel cell system 10 is initially set up, electrolyte 12 is introduced into the electrolyte storage tank 40, and the non-return valve 70 prevents the electrolyte 12 flowing into the water storage tank 60. During continuous normal operation of the fuel cell system 10 the non-return valve 70 does not have an impact on the water flow, and there is no tendency for the electrolyte 12 to flow in the reverse direction.

It will be appreciated that the fuel cell system 10 described above may be modified in various ways while remaining within the scope of the present invention. For example the linking duct 68, which is shown as being a straight duct through the common wall, might instead be a U-shaped duct linking the bottom portions of the storage tanks 40 and 60 and projecting below the bottoms of the storage tanks 40 and 60. The non-return valve 70, in another alternative, may be replaced by a manual valve, which would be closed during initial setup, when electrolyte 12 is being introduced, and would be opened once there was the appropriate level of water in the water storage tank 60, and the cell stack 20 had reached a steady state of operation. As another modification, the overflow 64 may be replaced by a sill or weir over which excess water passes; and such a sill or weir may be of adjustable height.

In a further alternative, the spent air stream and the exhaust gas stream are combined, and are passed through a single heat exchanger 50 followed by a liquid/gas separator 51, to generate the stream of water for the feed pipe 56.

What is claimed:

1. A liquid electrolyte fuel cell system comprising at least one fuel cell, each fuel cell comprising a liquid electrolyte chamber between opposed electrodes, the electrodes being an anode and a cathode, and means for supplying a gas stream to a gas chamber adjacent to the electrode and withdrawing a spent gas stream from the gas chamber adjacent to the electrode, the system also comprising a liquid electrolyte storage tank, and means to circulate liquid electrolyte between the liquid electrolyte storage tank and each liquid electrolyte chamber;

wherein the system comprises a water storage tank and means for condensing water vapour from the spent gas stream, and for feeding the condensed water vapour into the water storage tank; the water storage tank having an overflow outlet; and with a duct providing communication between the liquid electrolyte storage tank and the water storage tank below the level of the overflow outlet, the communication duct including a non-return valve; wherein the water storage tank is adjacent to the liquid electrolyte storage tank, and shares a common wall with the electrolyte storage tank, and the water storage tank includes a plurality of baffles to suppress turbulence.

2. A liquid electrolyte fuel cell system as claimed in claim 1 wherein the height of the overflow outlet is adjustable.

3. A liquid electrolyte fuel cell system as claimed in claim 1, wherein the height of the overflow outlet is set such that when the electrolyte in the electrolyte storage tank is at a desired level, the pressure at the level of the communication duct is the same in both the electrolyte storage tank and the water storage tank.

4. A liquid electrolyte fuel cell system as claimed in claim 1 wherein the cross sectional area of the communication duct is such that during operation the flow rate of water through the communication duct prevents back-diffusion of electrolyte.

5. A liquid electrolyte fuel cell system as claimed in claim 1 wherein the electrode is a cathode.

6. A liquid electrolyte fuel cell system as claimed in claim 1 wherein respective gas streams are provided to gas chambers adjacent to the anode and to the cathode, and spent gas streams emerge from the gas chambers adjacent to the anode and to the cathode, and means for condensing water vapour and for feeding the condensed water vapour into the water storage tank are provided for each of the spent gas streams.

* * * * *